US010409002B2

(12) United States Patent
Testa et al.

(10) Patent No.: US 10,409,002 B2
(45) Date of Patent: Sep. 10, 2019

(54) INTEGRATED CIRCUIT OPTICAL INTERCONNECT (71) Applicant: Telefonaktiebolaget LM Ericsson (publ), Stockholm (SE)

(72) Inventors: Francesco Testa, Pisa (IT); Nicola Andriolli, Pisa (IT); Marco Romagnoli, Pisa (IT); Luigi Tallone, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/562,017

(22) PCT Filed: Apr. 2, 2015

(86) PCT No.: PCT/EP2015/057421
§ 371 (c)(1),
(2) Date: Sep. 27, 2017

(87) PCT Pub. No.: WO2016/155843
PCT Pub. Date: Oct. 6, 2016

(65) Prior Publication Data
US 2018/0106966 A1 Apr. 19, 2018

(51) Int. Cl.
*G02B 6/26* (2006.01)
*G02B 6/125* (2006.01)
(Continued)

(52) U.S. Cl.
CPC ......... *G02B 6/125* (2013.01); *G02B 6/12002* (2013.01); *G02B 6/4214* (2013.01);
(Continued)

(58) Field of Classification Search
CPC ........ G02B 6/26; G02B 6/262; G02B 6/4214; G02B 6/43; H01L 2924/00
See application file for complete search history.

(56) References Cited

U.S. PATENT DOCUMENTS

2002/0141704 A1 10/2002 Lim et al.
2005/0213872 A1 9/2005 Iwamori et al.
(Continued)

OTHER PUBLICATIONS

Biberman, Aleksandr et al., "Photonic Network-on-Chip Architectures Using Multilayer Deposited Silicon Materials for High-Performance Chip Multiprocessors", ACM Journal on Emerging Technologies in Computing Systems, vol. 7, No. 2, Article 7, Jun. 2011, 1-25.
(Continued)

*Primary Examiner* — Jennifer Doan
(74) *Attorney, Agent, or Firm* — Patent Portfolio Builders, PLLC (57) ABSTRACT An integrated circuit optical interconnect for connecting a first circuit part arranged to output an optical signal and a second circuit part arranged to receive an optical signal. The integrated circuit optical interconnect comprises a body comprising a glass material. The glass material has embedded therein an optical waveguide arrangement having an input, located at a surface of the body, for coupling to the first circuit part, and an output, located at a surface of the body, for coupling to the second circuit part. The optical waveguide arrangement comprises at least two optical waveguide segments extending in different directions through the glass material and at least one reflecting part arranged between the two optical waveguide segments, for directing an optical signal from one of the optical waveguide segments to the other of the optical waveguide segments. The optical waveguide arrangement is arranged to optically couple the input and the output, whereby an optical signal can pass from the input to the output through the optical waveguide arrangement. There is also provided an integrated circuit module comprising the integrated circuit optical interconnect, and a telecommunications switch compris-
(Continued)

ing the integrated circuit module. There is further provided a method for manufacturing an integrated circuit optical interconnect.

15 Claims, 4 Drawing Sheets

(51) Int. Cl.
    *G02B 6/43*     (2006.01)
    *G02B 26/08*    (2006.01)
    *H04B 10/80*    (2013.01)
    *G02B 6/12*     (2006.01)
    *G02B 6/42*     (2006.01)

(52) U.S. Cl.
    CPC ........... *G02B 6/43* (2013.01); *G02B 26/0816* (2013.01); *H04B 10/803* (2013.01); *G02B 6/4224* (2013.01)

(56) References Cited

U.S. PATENT DOCUMENTS

2015/0078712 A1    3/2015   Brunner et al.
2015/0205041 A1*   7/2015   Neelakantan ..... H01L 27/14629
                                                            385/14

OTHER PUBLICATIONS

Meany, Thomas et al., "Towards low-loss lightwave circuits for non-classical optics at 800 and 1,550 nm", Applied Physics A—Materials Science & Processing, Nov. 12, 2013, 113-118.

Sherwood-Droz, Nicolas et al., "Scalable 3D dense integration of photonics on bulk silicon", Optics Express, vol. 19, No. 18, Aug. 29, 2011, 17758-17765.

* cited by examiner

INTEGRATED CIRCUIT OPTICAL INTERCONNECT

TECHNICAL FIELD

The present invention relates to an integrated circuit optical interconnect, an integrated circuit module comprising an integrated circuit optical interconnect, a telecommunications network switch comprising the integrated circuit module and a method of manufacturing an integrated circuit optical interconnect.

BACKGROUND

The utilisation of silicon photonics technology, leveraging on its compatibility with current complementary-metal-oxide-semiconductor (CMOS) production processes, is extending from current low to medium volume applications, for example in parallel optical transceivers, to optical multi-chip modules (OMCM) in new high bandwidth hardware platforms. Advantageously, OMCMs enable electronic and optical chips to be integrated within a single module, with low power consumption, high processing capacity and low footprint. It is expected that these OMCMs may be used for example in high capacity switches for data centres and in large IP routers, as the increase in traffic demand pushes telecommunication equipment vendors to continually increase the bandwidth density of their switching equipment, as well as to reduce the cost and power consumption of the equipment.

A first OMCM technology which may deployed may be an OMCM comprising only a single 3D interposer. The OMCM may comprise a silicon photonics integrated circuit (SOI) chip (performing input/output functions) with an electronic integrated circuit (EIC) on top of it. The EIC may perform signal processing functions, and be connected, with very short wires (2-3 cm) to one or a few high capacity electronic processing ASIC/FPGAs. However, to increase the bandwidth density of the modules, it is expected that more than one 3D interposer may be integrated in a single OMCM.

However, a problem then arises of how to effectively interconnect the respective silicon photonics integrated chips using optical links, whilst avoiding waveguide crossing, and taking into account that the dimensions of a single optical interposer are currently limited to about 3 cm×3 cm owing to the size of the photo-mask reticule used to produce CMOS chips. This problem will increase as it is desired to integrate more and more chips onto an OMCM.

SUMMARY

An integrated circuit optical interconnect for optically interconnecting a number of chips, whilst avoiding waveguide crossings and enabling the chips to be positioned close to one another, has been proposed in Nicolas Sherwood-Droz and Michal Lipson: "Scalable 3D dense integration of photonics on bulk silicon", Optics Express, Vol. 19, No. 18, 29 Aug. 2011, and also in A. Biberman et al. "Photonic Network-on-chip Architectures Using Multilayer Deposited Silicon Materials for High-Performance Chip Multiprocessors", ACM Journal on Emerging Technologies in Computing Systems, Vol 7, No. 2, Article 7, Pub. Date: June 2011. This integrated circuit optical interconnect has a three dimensional structure comprising many photonic layers having silicon nitride waveguides deposited thereon. This structure, owing to its 3D nature, enables a number of optical chips to be interconnected, over a limited surface area. However, a problem with this structure is that it is not straightforward to optically interconnect the silicon nitride waveguides to the respective optical chips. One option is to use an evanescent coupling mechanism between the photonic layers. However, this mechanism does not allow signals to be exchanged between non-adjacent layers, and thus limits and or complicates the design of the interconnect. An alternative method is to provide holes in the structure to allow vertical propagation of the optical beams from/to the respective optical chips, and the waveguides. However, these holes may result in the beams diverging during propagation, causing optical power spread and consequent increases in propagation losses. This method would also require collimating lenses to be positioned in the holes, which would increase the complexity of the structure. Furthermore, due to the high index of silicon nitride, the size of the waveguides is sub-micrometric. This means that the waveguides must be very accurately overlaid onto the respective circuit parts, which increases manufacturing costs. Furthermore, the propagation loss of the structure is in the order of 1 dB/cm which may be unacceptable high for an optical interconnect of say 10-30 centimeters.

The present invention aims to provide an improved integrated circuit optical interconnect for connecting a first circuit part arranged to output an optical signal and a second circuit part arranged to receive an optical signal.

According to the present invention, there is provided an integrated circuit optical interconnect for connecting a first circuit part arranged to output an optical signal and a second circuit part arranged to receive an optical signal. The integrated circuit optical interconnect comprises a body comprising a glass material. The glass material has embedded therein an optical waveguide arrangement having an input, located at a surface of the body, for coupling to the first circuit part, and an output, located at a surface of the body, for coupling to the second circuit part. The optical waveguide arrangement comprises two optical waveguide segments extending in different directions through the glass material and a reflecting part arranged between the two optical waveguide segments, for directing an optical signal from one of the two optical waveguide segments to the other of the two optical waveguide segments. The optical waveguide arrangement is arranged to optically couple the input and the output, whereby an optical signal can pass from the input to the output through the optical waveguide arrangement.

The term "extending" means that the respective optical waveguide segment has a length i.e. a longitudinal axis extending in a particular direction, such that the optical waveguide segment guides an optical signal in that direction. The at least two optical waveguide segments may extend in any direction through the glass body, and in particular at least one of the optical waveguide segments may have a vertical component, with respect to the surface of the body at which the input and or output is located.

Thus, embodiments of the present invention advantageously provide an integrated circuit optical interconnect which can be used to interconnect a number, potentially a large number, of optical circuit parts, over a limited area. Moreover, embodiments of the present invention may provide an integrated circuit optical interconnect which is more effective, easier to manufacture and thus cheaper than the above-described prior art proposal. By embedding the optical waveguide arrangement in the glass material, advantageously "vertical" waveguide segments may be formed in the structure, avoiding the problems set out above. Further, since glass waveguides are used, the optical interconnect may offer lower propagation loss, for example as low as 0.02 dB/cm. Further, given glass waveguides can have larger dimensions than silicon nitride waveguides, embodiments of the present invention may provide a more relaxed alignment tolerance with the respective optical circuit parts.

The body may comprise one, or preferably multiple layers of glass material. This may facilitate embedding multiple optical waveguide arrangements in the body, for coupling to respective input/output optical circuit parts.

The reflecting part may comprise an edge of a layer of the glass material. Alternatively, the reflecting part may be integrated in the glass material.

The input and the output may be located at the same surface of the body.

According to embodiments of the present invention, the optical waveguide arrangement may comprise a first optical waveguide segment extending through the glass material at an angle, greater than zero, with respect to the surface of the body at which the input is located, and a second optical waveguide segment extending through the glass material at an angle, greater than zero, with respect to the surface of the body at which the output is located.

According to a preferred embodiment of the present invention, the optical waveguide arrangement further comprises a third optical waveguide segment arranged between the first optical waveguide segment and the second optical waveguide segment. The optical waveguide arrangement may further comprise a first reflecting part arranged between the first optical waveguide segment and the third optical waveguide segment, for directing an optical signal from the first optical waveguide segment to the third optical waveguide segment. The optical waveguide arrangement may further comprises a second reflecting part arranged between the third optical waveguide segment and the second optical waveguide segment, for directing an optical signal from the third optical waveguide segment to the second optical waveguide segment.

According to this preferred embodiment of the present invention, each of the angles at which the first and second optical waveguide segments extend through the glass material may be substantially 90 degrees.

The first optical waveguide segment may extend from the input into the glass material. The second optical waveguide segment may extend from the output into the glass material.

According to a preferred embodiment of the present invention, the integrated circuit optical interconnect is further suitable for connecting a third circuit part arranged to output an optical signal and a fourth circuit part arranged to receive an optical signal. The glass material may have embedded therein a further optical waveguide arrangement. The further optical waveguide arrangement may have a further input, located at a surface of the body, for coupling to the third circuit part, and a further output, located at a surface of the body, for coupling to the fourth circuit part. The further optical waveguide arrangement may comprise two optical waveguide segments extending in different directions through the glass material and a reflecting part arranged between the two optical waveguide segments, for directing an optical signal from one of the two optical waveguide segments to the other of the two optical waveguide segments. The further optical waveguide arrangement is arranged to optically couple the further input and the further output, whereby an optical signal can pass from the further input to the further output through the further optical waveguide arrangement.

In preferred embodiments of the present invention the glass material is transparent. This may facilitate alignment of the optical interconnect with the respective input/output circuit parts, and thus may reduce the costs of manufacturing an integrated circuit module comprising the optical interconnect. Preferably, the glass material is silica, although other appropriate glass materials may be used.

According to the present invention, there is also provided an integrated circuit module comprising a first circuit part for outputting an optical signal and a second circuit part for receiving an optical signal. The integrated circuit module further comprises an integrated circuit optical interconnect embodying the present invention arranged to connect the first circuit part and the second circuit part.

According to the present invention, there is further provided a telecommunications network switch comprising the integrated circuit module.

According to the present invention, there is further provided a method of manufacturing an integrated circuit optical interconnect for connecting a first circuit part arranged to output an optical signal and a second circuit part arranged to receive an optical signal. The method comprises forming a body comprising a glass material. The method further comprises forming an optical waveguide arrangement in the glass material, the optical waveguide arrangement having an input, located at a surface of the body, for coupling to the first circuit part, and an output, located at a surface of the body, for coupling to the second circuit part. The step of forming the optical waveguide arrangement comprises forming two optical waveguide segments extending in different directions through the glass material and forming a reflecting part arranged between the two optical waveguide segments, for directing an optical signal from one of the two optical waveguide segments to the other of the two optical waveguide segments, wherein the optical waveguide arrangement is arranged to optically couple the input and the output, whereby an optical signal can pass from the input to the output through the optical waveguide arrangement.

In preferred embodiments of the present invention, the step of forming the optical waveguide arrangement comprises forming the optical waveguide arrangement using a laser, for example forming at least a portion of the optical waveguide arrangement (e.g. the "vertical" waveguides, which extend at an angle with respect to the surface on which the input/output is located) using femtosecond laser waveguide writing.

BRIEF DESCRIPTION OF THE DRAWINGS

Embodiments of the present invention will now be described, by way of example only, and with reference to the accompanying drawings in which.

DETAILED DESCRIPTION

Figure 1:
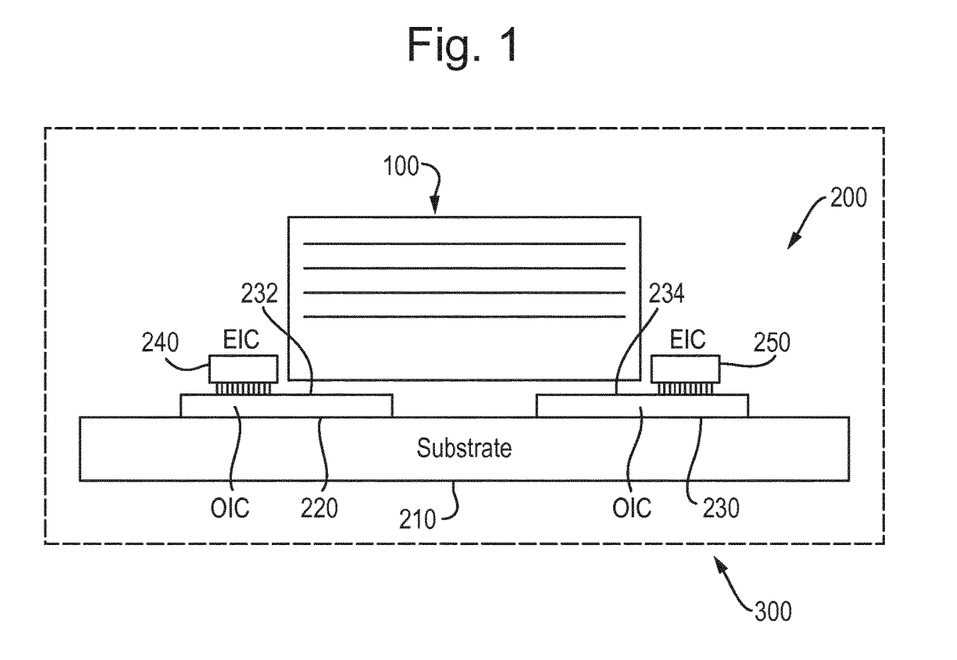
FIG. 1 is a schematic diagram showing an integrated circuit optical module comprising an integrated circuit optical interconnect according to an embodiment of the present invention.

FIG. 1 shows an integrated circuit module 200 according to an embodiment of the present invention. The integrated circuit module 200 comprises a substrate 210. Provided on the substrate 210 are two optical integrated circuits 220, 230. The optical integrated circuits 220, 230 may be manufactured using silicon photonics technology. In this example, each of the optical integrated circuits 220, 230 has a respective electronic integrated circuit 240, 250 provided thereon. Further, in this example, the integrated circuit module 200 is part of a telecommunications network switch 300. However, it will be appreciated that the integrated circuit module 200 may be used in other applications. At least a first of the optical integrated circuits 220, 230 comprises a first circuit part 232 arranged to output an optical signal. At least the other optical integrated circuit 220, 230 comprises a second circuit part 234 arranged to receive the optical signal.

The integrated circuit module 200 further comprises an integrated circuit optical interconnect 100 arranged to optically interconnect the first circuit part 232, on one of the optical integrated circuits 220, 230 to the second circuit part 234, on the other of the optical integrated circuits 220, 230. It should be appreciated that, although FIG. 1 only shows the integrated circuit module 200 comprising two optical integrated circuits 220, 230, the integrated circuit module 200 may advantageously comprise many more optical integrated circuits, which may also be interconnected by the integrated circuit optical interconnect 100, according to preferred embodiments of the present invention.

Figure 2:
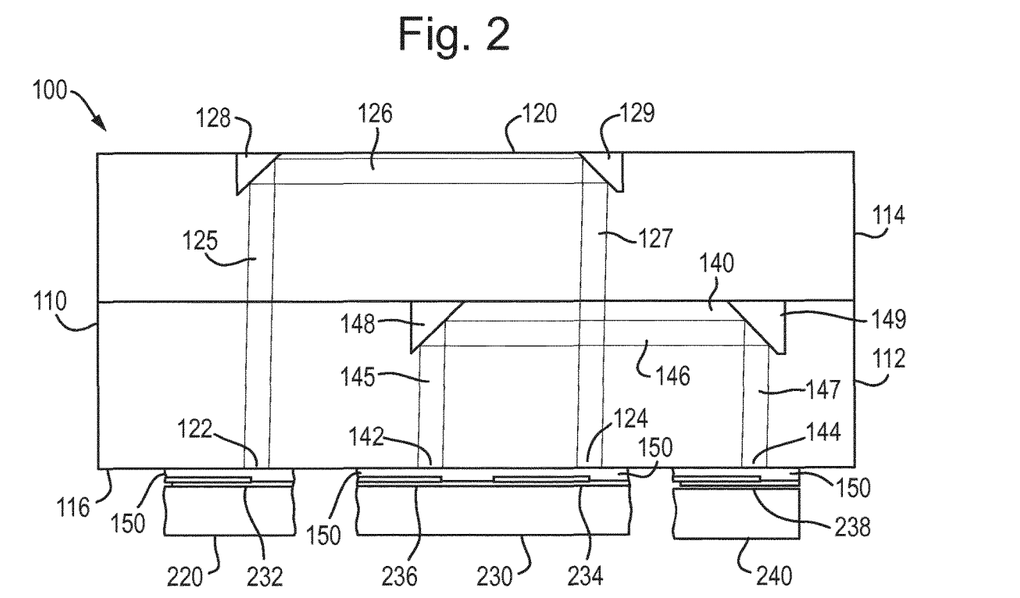
FIG. 2 shows an integrated circuit optical interconnect according to a first embodiment of the present invention.

FIG. 2 shows an integrated circuit optical interconnect 100 according to a first embodiment of the present invention. FIG. 2 shows a side view of the integrated circuit optical interconnect 100. In this example, the integrated circuit optical interconnect 100 is configured to optically interconnect a first optical integrated circuit 220 and a second optical integrated circuit 230, and also to optically interconnect the second optical integrated circuit 230 to a third optical integrated circuit 240. However, the integrated circuit optical interconnect 100 may be configured to interconnect more, or fewer, optical circuit parts.

The integrated circuit optical interconnect 100 comprises a body 110 made of a glass material. The glass material may for example be silica, and preferably the glass material is transparent. However, other suitable glass materials may be used. In this example, the body 110 comprises two layers 112, 114 of glass material. However, in other examples there may be more, or only one, layer of glass material.

The glass material has embedded therein a first optical waveguide arrangement 120 arranged to optical interconnect a first circuit part 232 arranged to output an optical signal and a second circuit part 234, arranged to receive an optical signal, on the first and second optical integrated circuits 220, 230 respectively. In this example, the glass material also has embedded therein a second optical waveguide arrangement 140 arranged to optically interconnect a third circuit part 236, arranged to output an optical signal, and a fourth circuit part 238, arranged to receive the optical signal, on the second and third optical integrated circuits 230, 240 respectively.

The first optical waveguide arrangement 120 has an input 122, located at a surface 116 of the body 110, for coupling to the first circuit part 232, and an output 124, located at a surface 116 of the body 110, for coupling to the second circuit part 234. In this example, the input 122 and the output 124 are located on the same surface of the body 110. However, it is possible that the input 122 and output 124 could be located on different surfaces of the body 100.

This optical waveguide arrangement 120 is arranged to optically couple the input 122 and the output 124, whereby an optical signal can pass from the input 122 to the output 124 through the optical waveguide arrangement 120. The optical waveguide arrangement 120 comprises a plurality of optical waveguide segments (125, 126, 127). In particular the optical waveguide arrangement 120 comprises at least two optical waveguide segments (for example 125 and 126) extending in different directions through the glass material and at least one reflecting part 128 arranged between the two optical waveguide segments 125, 126, for directing an optical signal from one of the optical waveguide segments 125, 126 to the other of the optical waveguide segments 125, 126. In this example, there are three optical waveguide segments (125, 126, 127). However, in other embodiments, the optical waveguide arrangement could comprise two or more than three optical waveguide segments. Each of the optical waveguide segments is an optical waveguide, which extends in a particular direction, whereby an optical signal is guided by the optical waveguide along the length of the waveguide in this direction.

In more detail, in this example, the first optical waveguide segment 125 extends from the input 122 into the glass material. This optical waveguide segment 125 thus extends through the glass material at an angle, greater than zero, with respect to the surface 116 of the body 110 at which the input 122 is located. In this example, the angle is approximately 90 degrees i.e. "vertical". However, this optical waveguide segment 125 may extend at different angle, which may for example be advantageous in order optimise coupling efficiency between the input 122 and the respective circuit part 232. In this example, the second optical waveguide segment 127 extends from the output 124 into the glass material. This optical waveguide segment 127 thus also extends through the glass material at an angle, greater than zero, with respect to the surface 116 of the body 110 at which the output 124 is located. Again, in this example, this angle is approximately 90 degrees i.e. "vertical", but other angles are possible. These two angles may be the same or different.

The third optical waveguide segment 126 is arranged between the first optical waveguide segment 125 and the second optical waveguide segment 127. The third optical waveguide segment 126 is coupled, at one end, to the first optical waveguide segment 125 and, at the other end, to the second optical waveguide segment 127. In this example, the third optical waveguide segment 126 is "horizontal", and extends substantially parallel to the surface 116 of the body 110 on which the input/output 122, 124 are located.

In this example, the optical waveguide arrangement 120 comprises two reflecting parts 128, 129. The optical waveguide arrangement 120 comprises a first reflecting part 128 arranged between the first optical waveguide segment 125 and the third optical waveguide segment 126, for directing an optical signal from the first optical waveguide segment 125 to the third optical waveguide segment 126. The first reflecting part 128 is arranged at the intersection between the first and third optical waveguide segments 125, 126. The optical waveguide arrangement 120 further comprises a second reflecting part 129 arranged between the third optical waveguide segment 126 and the second optical waveguide segment 127, for directing an optical signal from the third optical waveguide segment 126 to the second optical waveguide segment 127. The second reflecting part 129 is arranged at the intersection between the third and second optical waveguide segments 125, 126.

In this example, each reflecting part 128, 129 is at a surface of a layer 112, 114 of the glass material. In particular, in this example, the reflecting parts 128, 129, of the first optical waveguide arrangement 120, are at a surface of the uppermost layer 114 of the glass material. Thus, in this example, the first and second optical waveguide segments 125, 127 extend through multiple layers 112, 114 of glass layers.

In this example, each reflecting part 128, 128 (e.g. a micromirror) is integrated in the glass material, for example by using grey tone lithography.

The second optical waveguide arrangement 140, which connects the third and fourth circuit parts 236, 238, on the second and third optical integrated circuits 230, 240 respectively, is similar to the first optical waveguide arrangement 150. The second optical waveguide arrangement 140 has a third input 142, located at a surface 116 of the body 110, for coupling to the third circuit part 236, and a fourth output 144, located at a surface 116 of the body 110, for coupling to the fourth circuit part 236.

Again, in this example, these input and outputs 142, 144 are located on the same surface 16 of the body 110, but other arrangements are possible. The only difference between the second optical waveguide arrangement 140 and the first optical waveguide arrangement 120 is that the first and second optical waveguide segments 145, 147 of the second optical waveguide arrangement 140 extend only through the lower layer 112 of the glass material. In this example, the first and second reflective elements 148, 149 of the second optical waveguide arrangement 140, are provided at the top of the lower layer 112 of the glass material.

It should be appreciated that, whilst FIG. 2 shows only a lateral view of the integrated circuit optical interconnect 100 (x and z dimensions), the integrated circuit optical interconnect 100 is three dimensional. Thus, although the first optical waveguide arrangement 120 and the second optical waveguide arrangement 140 are shown "crossing", these optical waveguide arrangements 120, 140 do not in fact cross, since they are at different positions along the y axis (not shown). In general the three dimensional nature of the optical interconnect 100 advantageously enables several interconnect optical waveguide arrangements to be included in the interconnect 100 without impermissible waveguide crossing.

Figure 3:
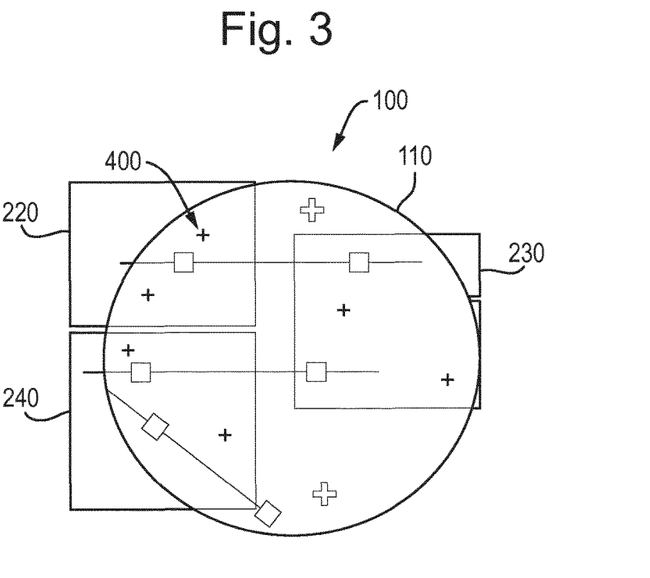
FIG. 3 shows the integrated circuit optical interconnect of FIG. 2 from a top view.

This is shown in FIG. 3, which shows the integrated circuit optical interconnect 100 of FIG. 2 from a top view (x and y dimensions) connected to the respective circuit parts. In this example, the integrated circuit optical interconnect 100 has circular shape from this perspective, and is thus cylindrical, but the interconnect 10 may have any shape as appropriate. Advantageously, in this embodiment, it is seen that the integrated circuit optical interconnect 100 is transparent, which aids alignment of the inputs/outputs with the respective circuit parts. In this example, the integrated circuit module chips 220, 230, 240 advantageously have alignment markers 400, which facilitate alignment of the integrated circuit optical interconnect 100 on the respective circuit parts, and thus manufacture of the integrated circuit module.

Figure 6:
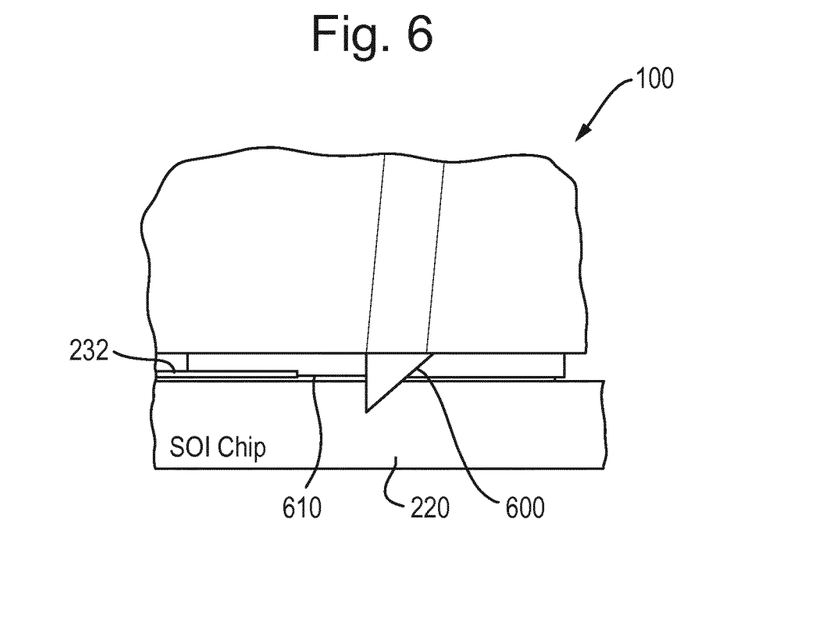
FIG. 6 shows an example coupling of an integrated circuit optical interconnect embodying the present invention to an optical circuit part.

In this example, as shown in FIG. 2, the inputs/outputs 122, 124, 142, 144 of the optical waveguide arrangements 120, 140 are connected to the respective circuit parts 232, 234, 236, 238 of the optical integrated chips 220, 230, 240 via respective grating couplers 150. In this case, the dimensions of the optical waveguide segments (e.g. 122 and 124) should be chosen to match the mode of the grating couplers 150, in order to reduce insertion loss. However, other means for connecting the inputs/outputs 122, 124, 142, 144 to the respective circuit parts are possible. For example, FIG. 6 shows an alternative means, comprising a micromirror 600 and an intermediate SiON waveguide 610, connected by means of an inverse taper.

Figure 4:
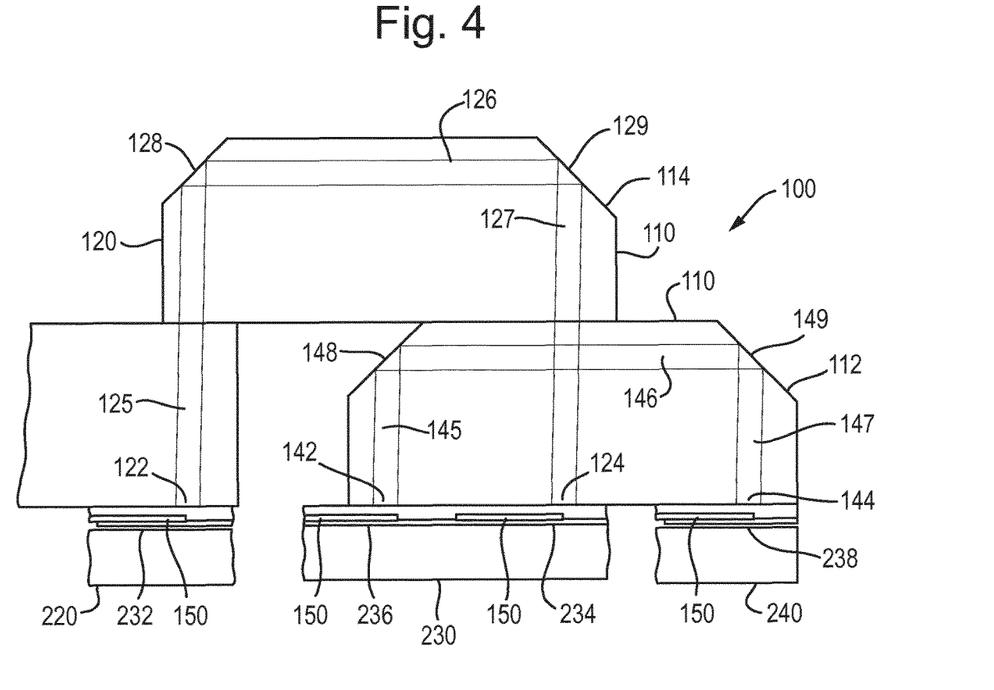
FIG. 4 shows an integrated circuit optical interconnect according to a second embodiment.
Figure 5:
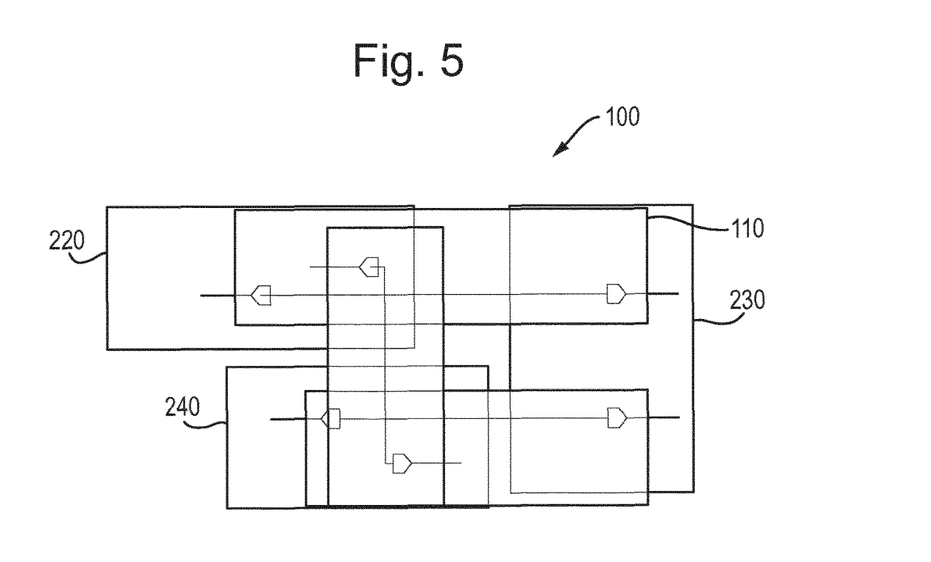
FIG. 5 shows the integrated circuit optical interconnect of FIG. 4 from a top view.

FIGS. 4 and 5 show an integrated circuit optical interconnect 100 according to a further embodiment of the present invention. The integrated circuit optical interconnect 100 is similar to the integrated circuit optical interconnect 100 described above in relation to FIGS. 2 and 3, and like reference numerals have been used in FIGS. 4 and 5. This example, in FIG. 4, again shows two optical waveguide arrangements 120, 140, each having an input 122, 142 and an output 124, 144 for connecting to respective circuit parts arranged to receive and or output an optical signal, on chips 220, 230, 240. However, there may be more, or fewer, optical waveguide arrangements 120, 140, as discussed above.

There are two main differences between this further embodiment of the present invention and the embodiment discussed above in relation to FIGS. 2 and 3. Firstly, in this example, the reflecting parts 128, 129, 148, 149 (e.g. mirrors) comprise edges of the layers 122, 114 of glass materials (for example corners), rather than being integrated in the glass material. In particular, the edges may be cut for example by angle polishing. The mirrors 128, 129, 148, 149 may also comprise a reflective metal. The other difference is that, in order to create more edges, and thus to enable the integration of more optical waveguide arrangements, the layers 112, 114 of the glass material may not have the same size and may each comprise several parts.

Thus, advantageously, embodiments of the present invention enable the optical interconnection of several circuit parts in an integrated circuit module, over a limited area, and in a manner which is easier to implement than alternative solutions. Example embodiments of the present invention have been described above, to aid understanding. However, it should be appreciated that alternative arrangements are possible. In particular, each optical waveguide arrangement may include more, or fewer (at least two) optical waveguide segments. There may also therefore be more reflecting parts, or only one reflecting part, as appropriate. Advantageously, at least two of the optical waveguide segments may have a "vertical component" with respect to the surface at which the input and or output is located.

Figure 7:
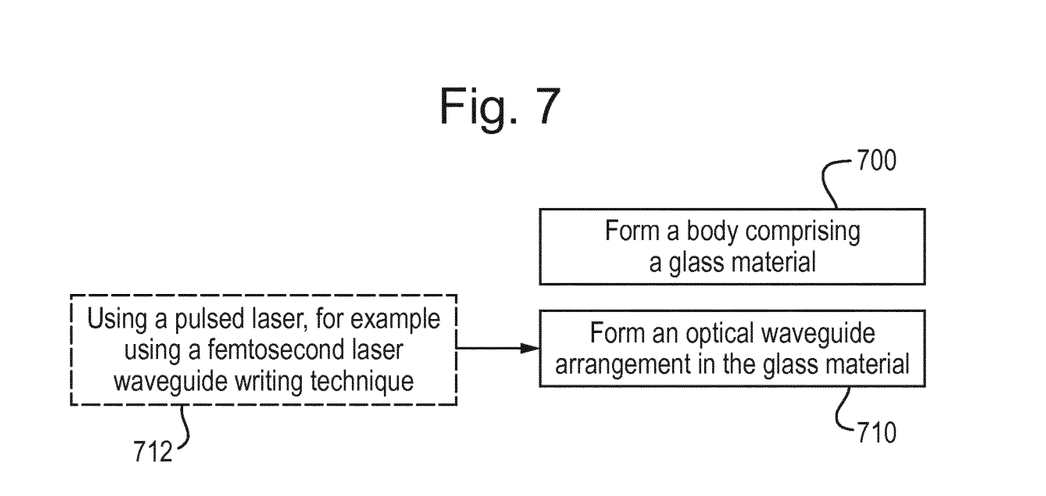
FIG. 7 is a flow chart showing a method of manufacturing the integrated circuit optical interconnect according to an embodiment of the present invention.

A method of manufacturing an integrated circuit optical interconnect for connecting a first circuit part arranged to output an optical signal and a second circuit part arranged to receive an optical signal according to an embodiment of the present invention is shown in FIG. 7.

The method comprises at 700 forming a body comprising a glass material. The glass material may for example be silica, but could be any other glass material which is suitable for forming therein the necessary optical waveguide arrangement. Preferably, the glass material, and the optical interconnect, is transparent. The method further comprises at 710 forming an optical waveguide arrangement in the glass material, the optical waveguide arrangement having an input, located at a surface of the body, for coupling to the first circuit part, and an output, located at a surface of the body, for coupling to the second circuit part. The step 710 of forming the optical waveguide arrangement comprises forming at least two optical waveguide segments extending in different directions through the glass material and forming at least one reflecting part arranged between the two optical waveguide segments, for directing an optical signal from one of the optical waveguide segments to the other of the optical waveguide segments, wherein the optical waveguide arrangement is arranged to optically couple the input and the output, whereby an optical signal can pass from the input to the output through the optical waveguide arrangement.

As indicated at step 712, the optical waveguide arrangement may be formed using a pulsed laser, and in particular using a femtosecond laser waveguide writing technique.

Thus, advantageously, the "vertical" optical waveguide segments, which extend into the glass material, with respect to the surface of the input and or output of the respective optical waveguide arrangement, may be formed using a pulsed laser, and in particular using femtosecond laser waveguide writing, for example as described in Thomas Meany, Simon Gross, Nemanja Jovanovic, Alexander Arriola, M. J. Steel, Michael J. Withford: "Towards low-loss lightwave circuits for non-classical opticals at 800 and 1550 nm" Appl. Phys. A (2014) 114: 113-118. The "horizontal" optical waveguide segments, which may extend substantially parallel to a surface of a layer of the glass material, for example along a surface (e.g. the upper surface) of a layer of the glass material, may also be formed using a femtosecond laser waveguide writing technique, or may be formed using another technique such as more traditional integrated optics technology.

As discussed above, the body in which the optical waveguide arrangement(s) are embedded may comprise one or more layers of glass material. The layers may be bonded together directly, and in which case the indexes of the glass layers should match. Alternatively, an index matching material may be provided between the layers. It is also possible that optical components for example optical filters/multiplexers/demultiplexers, for performing an optical function of the optical signals, may be embedded in the glass material, in the optical waveguide arrangement(s).

The invention claimed is:

1. An integrated circuit optical interconnect for connecting a first circuit part arranged to output an optical signal and a second circuit part arranged to receive an optical signal, the integrated circuit optical interconnect comprising:
a body comprising one or more layers of a glass material, wherein the glass material has embedded therein an optical waveguide arrangement having an input, located at a surface of the body, for coupling to the first circuit part, and an output, located at a surface of the body, for coupling to the second circuit part,
wherein the optical waveguide arrangement comprises:
two optical waveguide segments extending in different directions through the glass material; and
a reflecting part arranged between the two optical waveguide segments, for directing an optical signal from one of the two optical waveguide segments to the other of the two optical waveguide segments, and
wherein the optical waveguide arrangement is arranged to optically couple the input and the output, whereby an optical signal is configured to pass from the input to the output through the optical waveguide arrangement.

2. The integrated circuit optical interconnect of claim 1, wherein the reflecting part comprises an edge of a layer of the one or more layers, of the glass material.

3. The integrated circuit optical interconnect of claim 1, wherein the reflecting part is integrated in the glass material.

4. The integrated circuit optical interconnect of claim 1, wherein the input and the output are located at the same surface of the body.

5. The integrated circuit optical interconnect of claim 1, wherein the optical waveguide arrangement comprises:
a first optical waveguide segment extending through the glass material at an angle, greater than zero, with respect to the surface of the body at which the input is located; and
a second optical waveguide segment extending through the glass material at an angle, greater than zero, with respect to the surface of the body at which the output is located.

6. The integrated circuit optical interconnect of claim 5, wherein the optical waveguide arrangement further comprises a third optical waveguide segment arranged between the first optical waveguide segment and the second optical waveguide segment, the optical waveguide arrangement further comprising:
a first reflecting part arranged between the first optical waveguide segment and the third optical waveguide segment, for directing an optical signal from the first optical waveguide segment to the third optical waveguide segment; and
a second reflecting part arranged between the third optical waveguide segment and the second optical waveguide segment, for directing an optical signal from the third optical waveguide segment to the second optical waveguide segment.

7. The integrated circuit optical interconnect of claim 6, wherein the angle at which the first optical waveguide segment extends through the glass material and the angle at which the second optical waveguide segment extends through the glass material are substantially 90 degrees.

8. The integrated circuit optical interconnect of claim 5, wherein the first optical waveguide segment extends from the input into the glass material, and wherein the second optical waveguide segment extends from the output into the glass material.

9. The integrated circuit optical interconnect of claim 1, wherein the integrated circuit optical interconnect further connects a third circuit part arranged to output an optical signal and a fourth circuit part arranged to receive an optical signal, wherein the glass material has embedded therein a further optical waveguide arrangement, the further optical waveguide arrangement having a further input, located at a surface of the body, for coupling to the third circuit part, and a further output, located at a surface of the body, for coupling to the fourth circuit part,
wherein the further optical waveguide arrangement comprises:
two optical waveguide segments extending in different directions through the glass material; and
a reflecting part arranged between the two optical waveguide segments, for directing an optical signal from one of the two optical waveguide segments to the other of the two optical waveguide segments, and
wherein the further optical waveguide arrangement is arranged to optically couple the further input and the further output, whereby an optical signal is configured to pass from the further input to the further output through the further optical waveguide arrangement.

10. The integrated circuit optical interconnect of claim 1, wherein the glass material is transparent.

11. The integrated circuit optical interconnect of claim 1, wherein the glass material is silica.

12. An integrated circuit module comprising:
a first circuit part for outputting an optical signal;
a second circuit part for receiving an optical signal; and
an integrated circuit optical interconnect for connecting the first circuit part and the second circuit part, the integrated circuit optical interconnect comprising a body comprising one or more layers of a glass material,
wherein the glass material has embedded therein an optical waveguide arrangement having an input, located at a surface of the body, for coupling to the first circuit part, and an output, located at a surface of the body, for coupling to the second circuit part,
wherein the optical waveguide arrangement comprises:
two optical waveguide segments extending in different directions through the glass material; and
a reflecting part arranged between the two optical waveguide segments, for directing an optical signal from one of the two optical waveguide segments to the other of the two optical waveguide segments, and
wherein the optical waveguide arrangement is arranged to optically couple the input and the output, whereby an optical signal is configured to pass from the input to the output through the optical waveguide arrangement.

13. A telecommunications network switch comprising the integrated circuit module of claim 12.

14. A method of manufacturing an integrated circuit optical interconnect for connecting a first circuit part arranged to output an optical signal and a second circuit part arranged to receive an optical signal, the method comprising:
forming a body comprising one or more layers of a glass material; and
forming an optical waveguide arrangement in the glass material, the optical waveguide arrangement having an input, located at a surface of the body, for coupling to the first circuit part, and an output, located at a surface of the body, for coupling to the second circuit part,
wherein the step of forming the optical waveguide arrangement comprises:
forming two optical waveguide segments extending in different directions through the glass material; and
forming a reflecting part arranged between the two optical waveguide segments, for directing an optical signal from one of the two optical waveguide segments to the other of the two optical waveguide segments, and
wherein the optical waveguide arrangement is arranged to optically couple the input and the output, whereby an optical signal is configured to pass from the input to the output through the optical waveguide arrangement.

15. The method of claim 14, wherein the step of forming the optical waveguide arrangement comprises forming the optical waveguide arrangement using a pulsed laser, and wherein the pulsed laser utilizes a femtosecond laser pulse technique.

* * * * *